(No Model.) 2 Sheets—Sheet 1.
E. E. SAUM & F. E. BLACKMAN.
CHUCK FOR SCREW MACHINES.
No. 510,191. Patented Dec. 5, 1893.
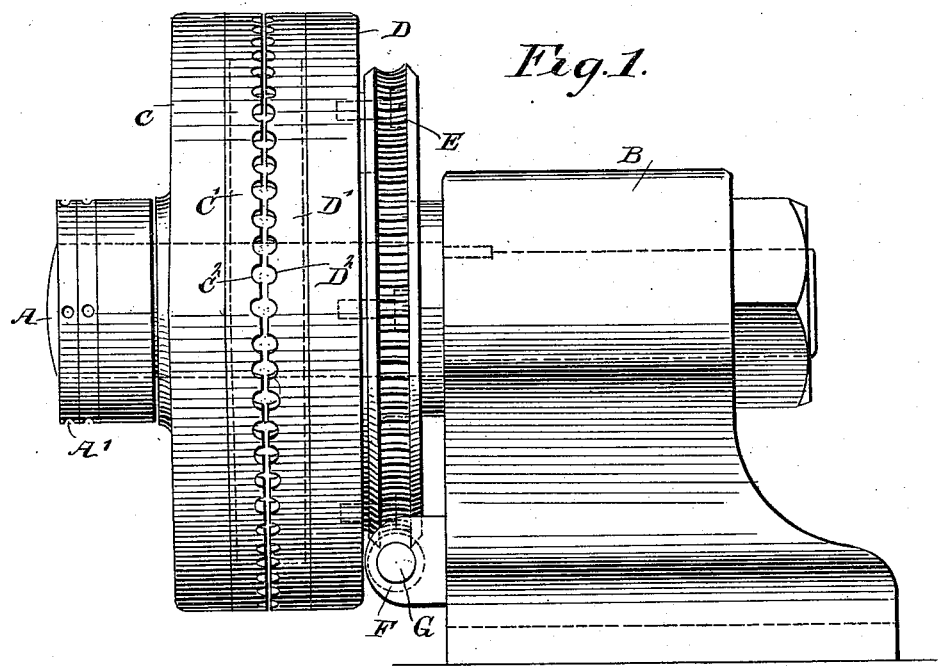
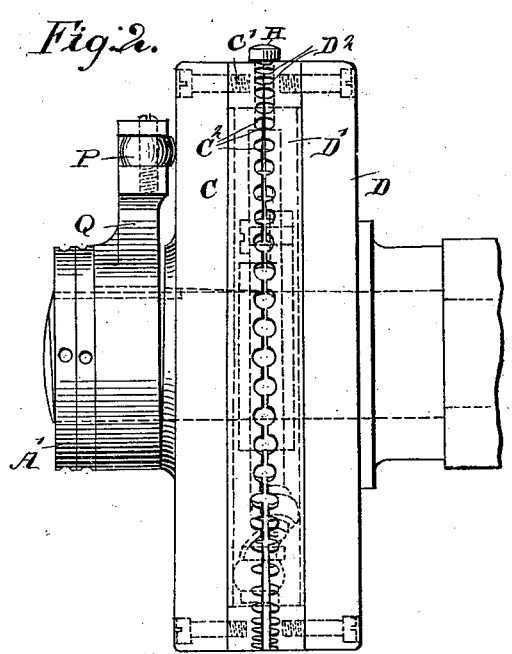
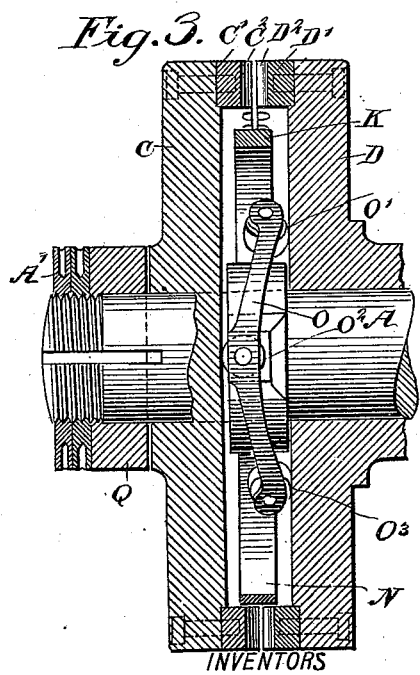
WITNESSES:
Paul Jabot
C. Sedgwick
INVENTORS
E. E. Saum
F. E. Blackman
BY Munn & Co
ATTORNEYS.

(No Model.) 2 Sheets—Sheet 2.
E. E. SAUM & F. E. BLACKMAN.
CHUCK FOR SCREW MACHINES.
No. 510,191. Patented Dec. 5, 1893.
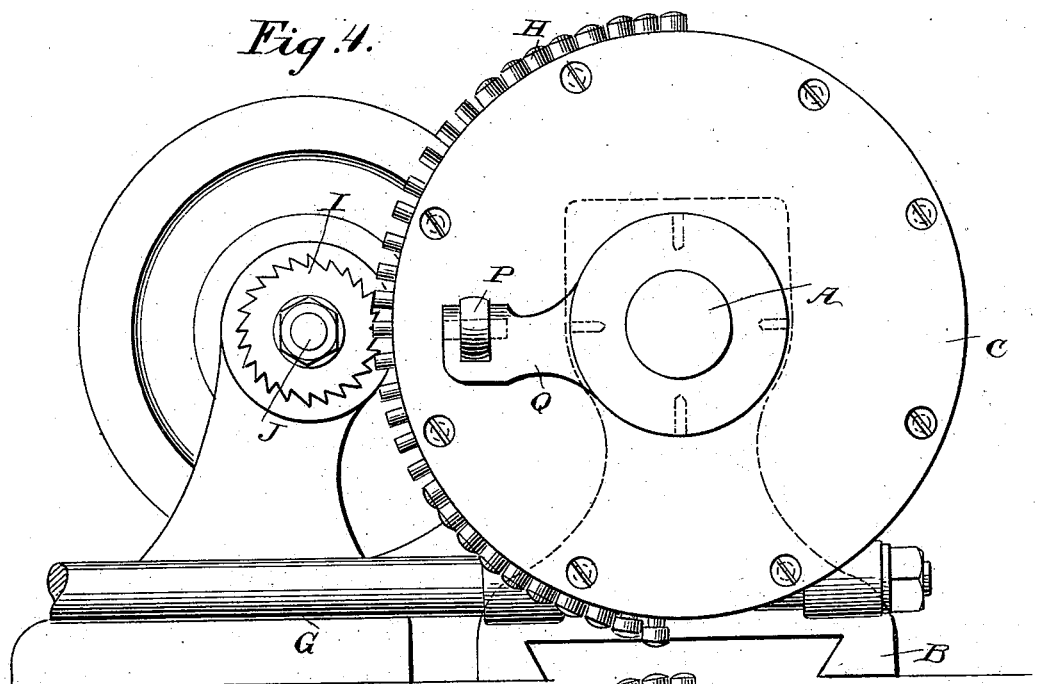
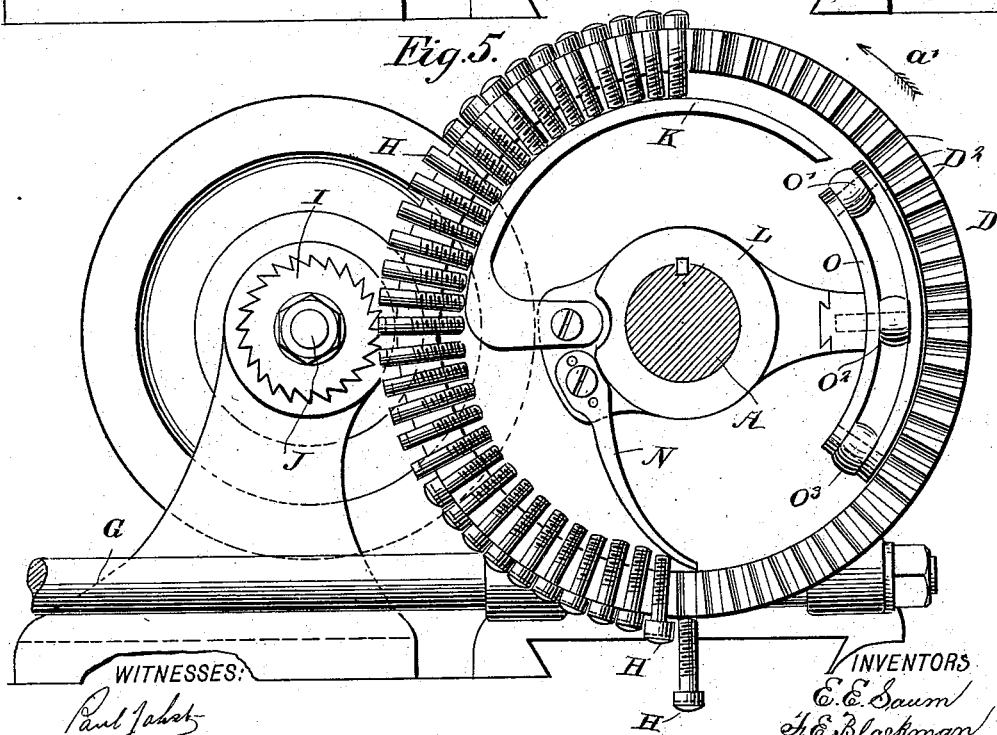
WITNESSES:
Paul Jahst
C. Sedgwick
INVENTORS
E. E. Saum
F. E. Blackman
BY Munn & Co.
ATTORNEYS.
THE NATIONAL LITHOGRAPHING COMPANY,
WASHINGTON, D. C.

UNITED STATES PATENT OFFICE.

EDWIN ELMER SAUM AND FREDERICK EDWIN BLACKMAN, OF STAMFORD, CONNECTICUT.

CHUCK FOR SCREW-MACHINES.

SPECIFICATION forming part of Letters Patent No. 510,191, dated December 5, 1893.

Application filed March 3, 1893. Serial No. 464,492. (No model.)

*To all whom it may concern:*

Be it known that we, EDWIN ELMER SAUM and FREDERICK EDWIN BLACKMAN, both of Stamford, in the county of Fairfield and State of Connecticut, have invented a new and Improved Chuck for Screw-Machines, of which the following is a full, clear, and exact description.

The object of the invention is to provide a new and improved chuck more especially designed for use in connection with milling machines, to conveniently and rapidly mill pins, screws and other articles.

The invention consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a side elevation of the improvement. Fig. 2 is a plan view of part of the same. Fig. 3 is a sectional side elevation of the same. Fig. 4 is a front view of the same; and Fig. 5 is a sectional front view of the same.

The improvement is provided with a spindle A secured in a suitable bearing B attached to the frame of the milling machine in any convenient manner, the projecting end of the spindle carrying the chuck, comprising principally two circular jaws C and D, of which the jaw D is mounted to rotate loosely on the shaft A, and the other jaw C is adapted to rotate with the jaw D, and also adapted to be tilted at one side so as to bring its face close to the opposite face of the jaw D.

The adjacent faces of the circular jaws C and D are provided with projecting rings C' and D' respectively, formed in their adjacent inner faces with recesses $C^2$ and $D^2$ respectively adapted to engage the article to be clasped and clamped between the jaws C and D. On the outer face of the jaw D is attached a worm wheel E, engaged by a worm F, secured on a transversely-extending shaft G, mounted to turn in suitable bearings on the bearing B, and connected with a suitable source of power to rotate the said shaft, so that the worm F revolves the worm wheel E, and the latter turns the jaw D.

The articles to be held by the chuck may be in the shape of pins, screws or other objects H, each of which is inserted at the tops of the jaws between two registering recesses $C^2$, $D^2$, so that the articles thus inserted in the several recesses cause the jaw C to travel along with the revolving jaw D.

To one side of the jaws C, D, is arranged a cutter I, of any approved construction, adapted to mill the projecting ends of the articles H, as will be readily understood by reference to Figs. 4 and 5, the cutting edge of the cutter being in alignment with the articles carried past the cutter on the revolving of the jaws, as above described. The cutter I is secured on the usual spindle J, and forms part of the milling machine, so that further description is not deemed necessary.

The inner ends of the articles H are supported on a segmental arm K, held between the jaws C and D inside of the rings C', D', respectively, so that the articles project a suitable distance on the periphery of the jaws C and D for the cutter I to act thereon. The arm K is secured on a bracket L, attached to the fixed spindle A, as is plainly shown in Fig. 5, and on the said bracket is also secured a spring N, extending downward and adapted to engage the inner ends of the articles H after they are slotted and when they near their lowermost position within the revolving chuck. The free end of the spring N, in engaging the inner ends of the articles, forces the same outward, out of engagement with their corresponding recesses $C^2$, $D^2$, the articles then dropping in a suitable receptacle arranged below the chuck.

On the bracket L, and directly opposite the cutter I, is arranged a segmental arm O, carrying friction rollers O', $O^2$ and $O^3$, of which the two outermost friction rollers O' and $O^3$ abut against the inner face of the jaw D, while the other, or middle friction roller $O^2$, travels on the inner face of the jaw C. See Fig. 3. By this arrangement this side of the jaw C is pressed away from the other jaw D, so that the diametrically opposite side of the said jaw C near the cutter I, is pressed closer to the other jaw, it being understood that the aperture in the jaw C for the passage of the spindle A is sufficiently large to permit a slight tilting of the jaw to securely grasp or clamp the articles in place. In order to hold this end of the jaw C in gripping contact, we provide a roller P pressing against the outer face of the jaw C near the cutter I, as is plainly shown in Fig. 4, the said friction roller being located diametrically opposite the friction roller $O^2$. The friction roller P is journaled in a bracket Q held near the outer end of the spindle A and secured in place thereon by suitable jam nuts A', as is shown in the drawings.

The operation is as follows: The articles to be milled are fed into the registering recesses $C^2$, $D^2$, at the tops of the jaws C, D, the latter being rotated in the direction of the arrow $a'$, by the means above described, so that the articles are carried toward the revolving cutter I, which mills the projecting outer ends of the articles at the time the said articles are securely clamped in place between the jaws by the tilting of one jaw toward the other at one side. After the articles are slotted, the further revolving of the jaws brings the slotted articles in contact, at their inner ends, with the spring N, and at the time the opening between the jaws increases, so that the articles are readily discharged from their receptacles and dropped to the floor at about the time they reach a lowermost position. See Fig. 5.

It will be seen that this device is very simple and durable in construction, and permits of milling a large number of articles in a very short time. It will further be seen that the articles to be operated on can be placed very close together so as to make the cut formed by the cutter I practically continuous.

We do not limit ourselves to any particular form of gripping jaws, as the same may be varied according to the work to be done. For larger or shorter articles, we use different sized segmental arms K to hold the outer ends of the articles a suitable distance from the peripheral surfaces of the jaws.

Having thus fully described our invention, we claim as new and desire to secure by Letters Patent—

1. The combination with the two rotary clamping plates recessed in their adjacent faces to receive the screws and adapted to be tilted with respect to each other, of an exterior roller mounted in stationary bearings and engaging the outer face of the tilting plate to cause the screws to be firmly clamped at that point, a stationary bracket between the two plates and having three friction rollers one of which engages the inner face of the tilting plate at a point about diametrically opposite to the exterior roller, and two other rollers at opposite sides of the first named interior roller and engaging the inner face of the other plate, substantially as set forth.

2. The combination with the stationary spindle A, the two clamping plates C D rotating thereon the plate C being adapted to tilt on said spindle, the stationary bracket Q on said spindle and provided with a roller engaging the outer face of the tilting plate C, a stationary bracket L on the spindle within the space between the two plates, the support K carried by the bracket to support the inner ends of the screws, the oppositely extending spring N projecting from the bracket L oppositely to said support with its free end in the path of the inner ends of the screws and the segmental arm O on the bracket between the free ends of support K and spring N and provided with a middle roller $O^2$ engaging the inner face of the tilting plate at a point about diametrically opposite to that engaged by the roller P, and the rollers $O'O^3$ on the ends of arm O and engaging the inner face of the non-tilting plate D, substantially as set forth.

3. The combination with a bearing B, and a stationary spindle A secured thereto, of the two clamping plates C D, mounted to rotate on the said spindle, the plate C being adapted to tilt toward the plate D, a gear wheel turning loosely on the spindle and connected to the plate D, a transverse shaft G provided with a gear meshing with said gear wheel, bracket Q on the outer end of the spindle and carrying a roller P engaging the outer face of plate C to tilt it toward plate D other rollers in the space between them for tilting plate C at that point away from plate D to release the screws, a support and a releasing spring also carried by the spindle between the said two plates, substantially as set forth.

EDWIN ELMER SAUM.
FREDERICK EDWIN BLACKMAN.

Witnesses:
ALFRED W. PIKE,
ANDREW D. SCRIMGEOUR, Jr.